(12) United States Patent
Albulet et al.

(10) Patent No.: US 6,995,750 B2
(45) Date of Patent: Feb. 7, 2006

(54) RF DATA COMPRESSION FOR A HIGH SPEED MOUSE

(75) Inventors: Mihai Albulet, Redmond, WA (US); Gary Rensberger, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 363 days.

(21) Appl. No.: 10/392,029

(22) Filed: Mar. 19, 2003

(65) Prior Publication Data

US 2004/0183780 A1 Sep. 23, 2004

(51) Int. Cl.
*G09G 5/00* (2006.01)

(52) U.S. Cl. ................................ 345/170; 345/168
(58) Field of Classification Search ........ 345/156–172, 345/170; 710/63, 65, 66, 68; 348/734
See application file for complete search history.

(56) References Cited

U.S. PATENT DOCUMENTS

| | | | | |
|---|---|---|---|---|
| 4,754,268 A | * | 6/1988 | Mori .......................... | 345/163 |
| 5,608,758 A | * | 3/1997 | Sakuma et al. ............. | 375/238 |
| 5,764,219 A | | 6/1998 | Rutledge et al. | |
| 6,144,369 A | * | 11/2000 | Shiga ......................... | 345/163 |
| 2001/0027530 A1 | * | 10/2001 | Yen et al. ................... | 713/300 |

OTHER PUBLICATIONS

E. Sisinni, et al., "A PLD Based Encoder Interface with Accurate Position and Velocity Estimation," Proceedings of the 2002 IEEE International Symposium on Industrial Electronics, V. 2, pp. 606-611, L'Aquila, Italy, Jul. 8-11, 2002.
Kim, Kyung-Chan, et al., "Design of a Signal Processing Slgorithm for Error-Minimized Optical Triangulation Displacement Sensors," Measurement Science and Technology, v. 12, No. 10, Oct. 2001, pp. 1683-1688.

* cited by examiner

*Primary Examiner*—Sumati Lefkowitz
*Assistant Examiner*—Ke Xiao
(74) *Attorney, Agent, or Firm*—Banner & Witcoff

(57) ABSTRACT

A pointing device is provided for reporting motion information about the pointing device. Counts representing movement in two dimensions are processed so that a packet data stream may accommodate the motion information. One aspect of the invention utilizes the value of count to determine whether compression of the motion information should be performed. When it is determined that compression should be performed, a compression function is selected, the count is processed by the compression function, and an indicator is set to indicate that the count is processed by the compression function. Reporting information, which includes the processed count and the indicator, is then transmitted to computer system. A user input interface that is associated with the computer system recovers the counts using appropriate inverse functions in accordance with the indicators.

21 Claims, 8 Drawing Sheets

RF DATA COMPRESSION FOR A HIGH SPEED MOUSE

FIELD OF THE INVENTION

The present invention relates to wireless pointing devices used with computers and other data input devices, and methods that may be used to report a change in position of the wireless pointing device.

BACKGROUND OF THE INVENTION

With the prior art, mechanical computer mice are typically specified to have a resolution of 400 dots per inch (dpi) and a maximum speed of 5 inches per second (ips), and may be tested before shipping to 7 ips. Some optical sensors within optical computer mice may be specified as having the same resolution as mechanical computer mice, but are capable of much higher speeds, such as speeds greater than 50 ips. Computer mice (both mechanical and optical), typically have resolution and speed limitation, in which no more than 7 bits of magnitude are needed to transmit the number of dots ($\Delta x$, $\Delta y$) counted during sampling intervals. For example, values from 0 through 127 can be represented in a 7-bit value and values in the range of –128 through 127 can be represented by a two's-complement value in 8 bits.

One particular prior art optical wireless computer mouse appears to send an 8 bit signed value (using a resolution of 800 dpi), indicating an amount of movement in each of a horizontal and vertical direction, via a radio frequency (RF) packet every 20 milliseconds, corresponding to a maximum mouse speed of about 8 ips. (50 RF packets per second (20 millisecond time intervals)×127 (maximum signed 8 bit value)×0.00125 inches per dot (800 dpi resolution) 7.9375 inches per second). Using a resolution of 400 dpi would yield a maximum speed of about 16 ips; however, the maximum tracking speed that a low speed USB device can support is 36 ips (at a 400 dpi resolution).

A ten-fold increase in speed, as may be attained by an optical mouse, means that displacement information ($\Delta x$, $\Delta y$ data) could have a magnitude up to ten times larger than the magnitude for prior art mechanical mice. Therefore, 4 additional bits, or 11 bits, would be required to report such a magnitude and 12 bits would be required to report 11 bits of magnitude and a sign bit.

With a wireless pointer device, e.g., a wireless high-speed mouse, displacement information that conveys movement of the wireless pointer device is typically transmitted on a packet data stream over a radio frequency channel. Of course, the faster the wireless pointer device can transverse, the number of bits that may be required to represent the movement increases. However, a user interface that receives this information may be limited in the amount of information that can be processed. For example, with a universal serial bus (USB) interface, packets are sent approximately every 8 msec, where each packet has a time duration of 8 msec or less. If additional bits are required to be transported over an existing packet structure, an increase of the duration of a packet may be necessary. However, restructuring the packet structure is not desirable and may increase the time latency. Hence, there is a real need to send displacement information from a wireless high speed pointer device so that the time duration of transmitted packets are not increased while a resulting error is maintained within an acceptable amount.

BRIEF SUMMARY OF THE INVENTION

The present invention provides method and apparatus for a pointing device, such as an optical wireless mouse, for reporting motion information about the pointing device. The present invention facilitates the support of high-speed pointing devices that require that an increased amount of motion information be transported over an existing structure of a packet data stream. With one aspect of the invention, counts representing movement in two dimensions are processed so that a packet data stream may accommodate the motion information. One aspect of the invention utilizes the value of count to determine whether compression of the motion information should be performed. When it is determined that compression should be performed, a compression function is selected, the count is processed by the compression function, and an indicator is set to indicate that the count is processed by the compression function. Reporting information, which includes the processed count (such as a numerical component) and the indicator (such as a flag component), is then transmitted to computer system over a wireless channel. Compression is configured in order to achieve a degree of compression, while limiting an inherent degree of error, so that motion information may be accommodated by a packet data stream, as may be supported by a universal serial bus (USB) interface for the wireless channel.

With another aspect of the invention, a user input interface that is associated with the computer system recovers the counts using appropriate inverse functions in accordance with the indicators. The inverse functions correspond to the functions that are utilized for compressing motion information. The recovered counts may be provided to a video interface so that a user may view a representation of the movement of the pointing device.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Figure 1:
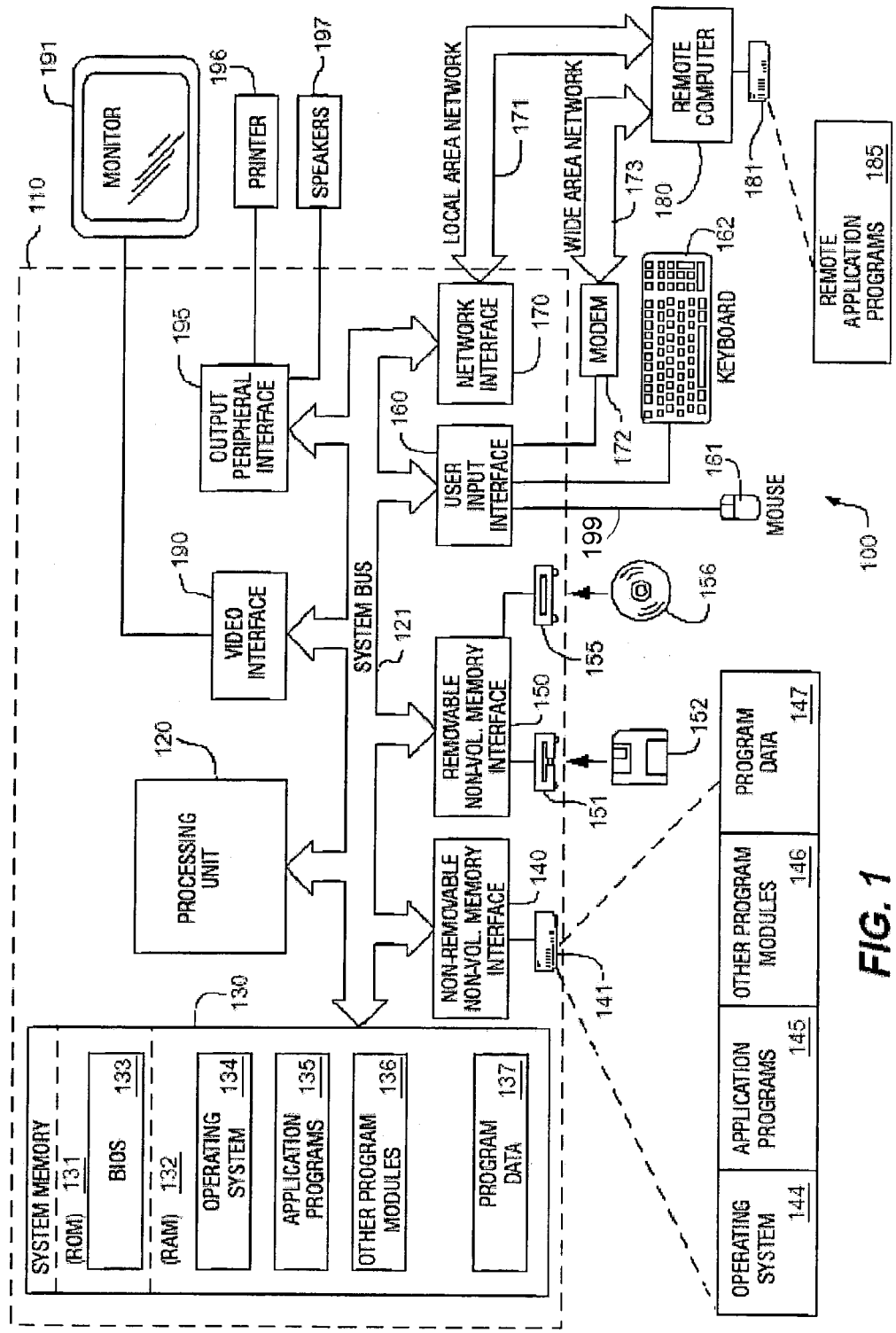
FIG. 1 illustrates an example of a suitable computing system environment on which the invention may be implemented.

FIG. 1 illustrates an example of a suitable computing system environment 100 on which the invention may be implemented. In particular, FIG. 1 shows an operation of a wireless pointer device 161, e.g. an optical wireless mouse, in the context of computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrate d in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and wireless pointing device 161, commonly referred to as a mouse, trackball or touch pad. In an embodiment of the invention, wireless pointing device 161 may be implemented as a mouse with an optical sensor for detecting movement of the mouse. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). In FIG. 1, wireless pointer 161 communicates with user input interface 160 over a wireless channel 199. Wireless channel 199 utilizes an electromagnetic signal, e.g., a radio frequency (RF) signal, an infrared signal, or a visible light signal. A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
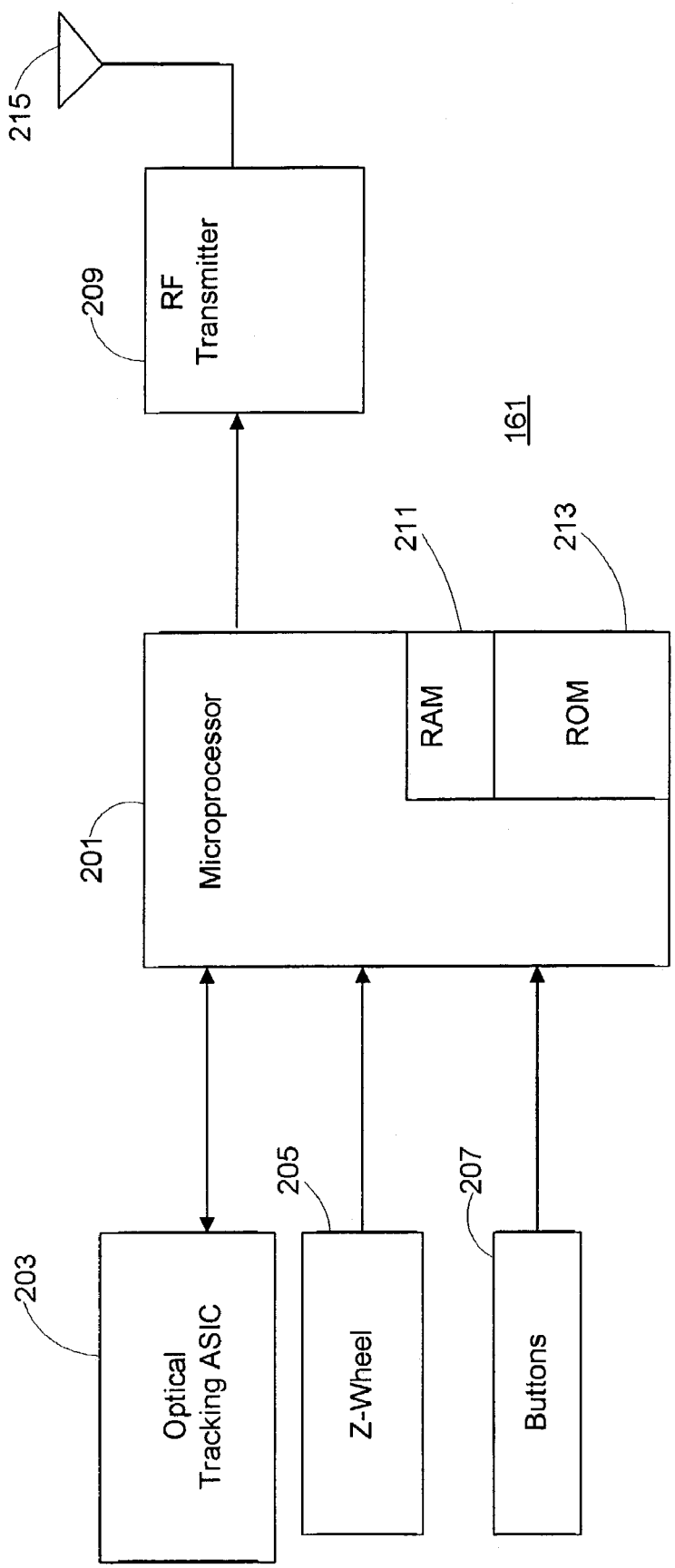
FIG. 2 shows an architecture of a wireless mouse in accordance with an embodiment of the invention.

FIG. 2 shows an architecture of a wireless mouse 161 in accordance with an embodiment of the invention. A tracking detector 203 tracks a movement of mouse 161 with a motion sensor and provides motion information to a microprocessor 201. Motion information may be represented as "dots", where a dot is represents incremental movement ($\Delta X, \Delta Y$) of mouse 161 in a x-dimension and a y-dimension, respectively. In an embodiment of the invention, tracking detector 203 utilizes an optical sensor and may have a resolution of 400 dpi (dots per inch) with a maximum speed of 50 inches per second (ips), although other embodiments may utilize other types of motion sensors with different characteristics. Also, a "Z-wheel" detector 205 provides information about scrolling and a buttons detector 207 obtains information about a user manipulating buttons (e.g. a left button and a right button) on mouse 161.

Mouse 161 accumulates $\Delta X, \Delta Y$ motion information from tracking detector 203 into 8 bit accumulators. Microprocessor 201 inserts the motion information into a packet data stream that is transmitted over a wireless channel by transmitter 209 through a transmitting antenna 215, in which each packet contains two 7-bit fields in order to provide displacement information for each of the two dimensions. In the embodiment, transmitter 209 operates on one of four RF channels at approximately 27 MHz with a 50 KHz bandwidth. However, variations of the embodiment may utilize different types of wireless channels and may operate with different center frequencies and bandwidths, including visible light spectra and infrared spectra.

In the embodiment, the packet data stream has a structure in which 7 bits are allocated for motion information (comprising a count for each dimension) corresponding to each dimension, corresponding to ($\Delta X, \Delta Y$) that are counted during each sampling interval (e.g. 20 msec). For example, with a report rate of a wireless universal serial bus (USB) interface, RF packets are typically shorter than 8 msec. Limiting the packet duration ensures that every USB report can be filled with motion data, thus generating a smooth motion on a video screen. Mouse 161 reduces the time latency to a latency that is comparable to that of a standard wired mouse. Limiting the duration of a packet helps reduce the time latency associated with viewing the movement of the wireless pointer. However, without a transformation (compression) of the motion information, more than 7 bits may be necessary for representing information in each dimension. (Transformation of the motion information is discussed in the context of FIGS. 3–6 as discussed later.)

Figure 3:
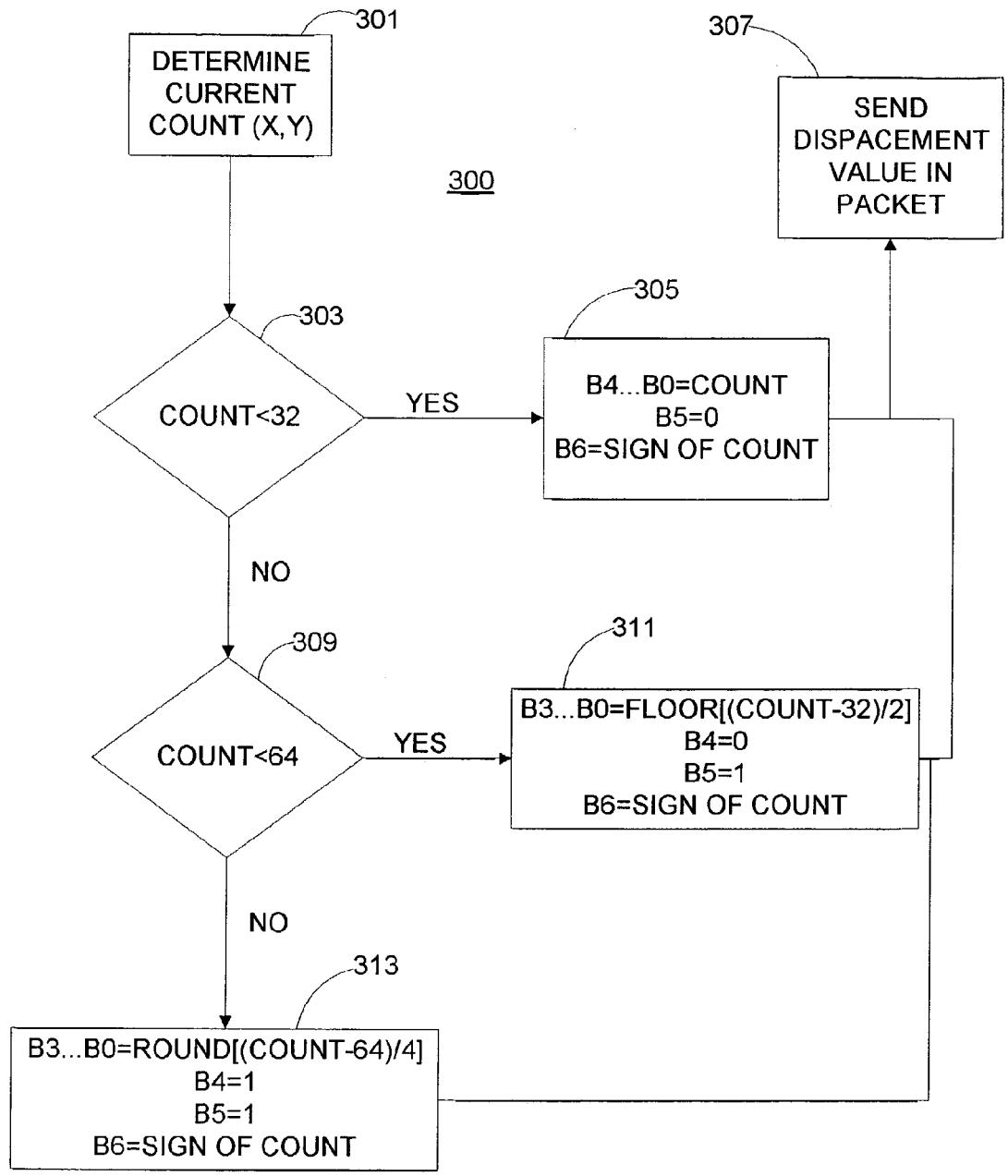
FIG. 3 is a flow diagram for compressing motion information from a wireless pointer device to a computing system in accordance with an embodiment of the invention.

FIG. 3 is a flow diagram 300 for compressing motion information from a wireless pointer device (e.g. mouse 161) to computer 110 in accordance with an embodiment of the invention. $\Delta X, \Delta Y$ values in the range of [−127 ... +127] use only 7 bits for each sampling period, corresponding to a packet transmission by transmitter 209. One bit is used for a sign component, 4 or 5 bits are used to contain precision information (a numerical component), while the remaining bits (one or two) are flags indicating how to process the numerical value contained in the precision information. Table 1 shows a first exemplary embodiment for compressing motion information from tracking detector 203, corresponding to flow diagram 300.

TABLE 1

FIRST EXEMPLARY EMBODIMENT FOR COMPRESSING MOTION INFORMATION

| Bit 5 | Bit 4 | Bit 3210 | Used if | How count is encoded | Max. error [counts] | Max. error [%] |
|---|---|---|---|---|---|---|
| 0 | $b_4$ | $b_3b_2b_1b_0$ | count = 0 ... 31 | $b_4b_3b_2b_1b_0$ | 0 | 0 |
| 1 | 0 | $b_3b_2b_1b_0$ | count = 32 ... 63 | $b_3b_2b_1b_0$ = floor [(count − 32)/2] | 1 | 3 |
| 1 | 1 | $b_3b_2b_1b_0$ | count = 64 ... 127 | $b_3b_2b_1b_0$ = round [(count − 64)/4] | 2 | 3 |

Table 1 shows a maximum percentage error corresponding to the compression of a count. In the example of the embodiment, the maximum error does not exceed 3% of a count. Bit 6 (not shown in Table 1) is used for sign, following a simple convention (e.g., bit 6=0 means positive displacement and bit 6=1 means negative displacement). Alternatively, the numbers can be represented in 2's complement format (bits 6 . . . 0). As illustrated in Table 1, larger errors are generally associated with larger displacements. However, a larger displacement is associated with a faster motion of pointer device 161. Typically, a user's tolerance to error increases with a faster motion of pointer device 161.

With flow diagram 300, each count for each dimension is processed so that only 7 bits are required for representing displacement information in each packet of the packet data stream. Each displacement value comprises a sign component (corresponding to the direction of movement in a given dimension), a numerical component (corresponding to a magnitude of the movement), and a flag component (corresponding to an indicator for processing the magnitude component at user input interface 160. In step 301, counts (corresponding to a first count for the x-dimension and a second count corresponding to a second count for the y-dimension) are obtained from tracking detector 203 and are provided to microprocessor 201. In step 303, if the count is less than 32, the numerical component (bits 4, 3, 2, 1, and 0) is equated to the count. Also, the flag component comprises bit 5 and is set to '0'. In step 309, if the count is less than 64 and greater than 32, step 311 is executed in which the numerical component (bits 3, 2, 1, and 0) is equated to:

$$\text{floor}((\text{count}-32)/2) \quad (\text{EQ. 1})$$

where the "floor" function truncates the argument to the integer value. As an example, if the count equals 39, floor((39−32)/2)=floor(7/2)=3. A scaling factor and an offset may be associated with a compression function. For example, in EQ. 1, the corresponding scaling factor is equal to 2 and the corresponding offset is equal to 32. Also, the flag component comprises bits 4 and 5, which are set to '0' and '1', respectively. If the count is equal to greater than 64, step 313 is executed in which the numerical component is equated to:

$$\text{round}((\text{count}-64)/4) \quad (\text{EQ. 2})$$

where the "round" function rounds the argument to the nearest integer value. As an example, if the count equals 103, round((103−64)/4)=round(39/4)=10. Also the flag component comprises bits 4 and 5, both of which are set to '1'. Also, in some embodiment, scrolling information from detector 205 ("Z wheel") may be processed in a similar manner as motion information (ΔX,ΔY) in accordance with flow diagram 300.

Figure 4:
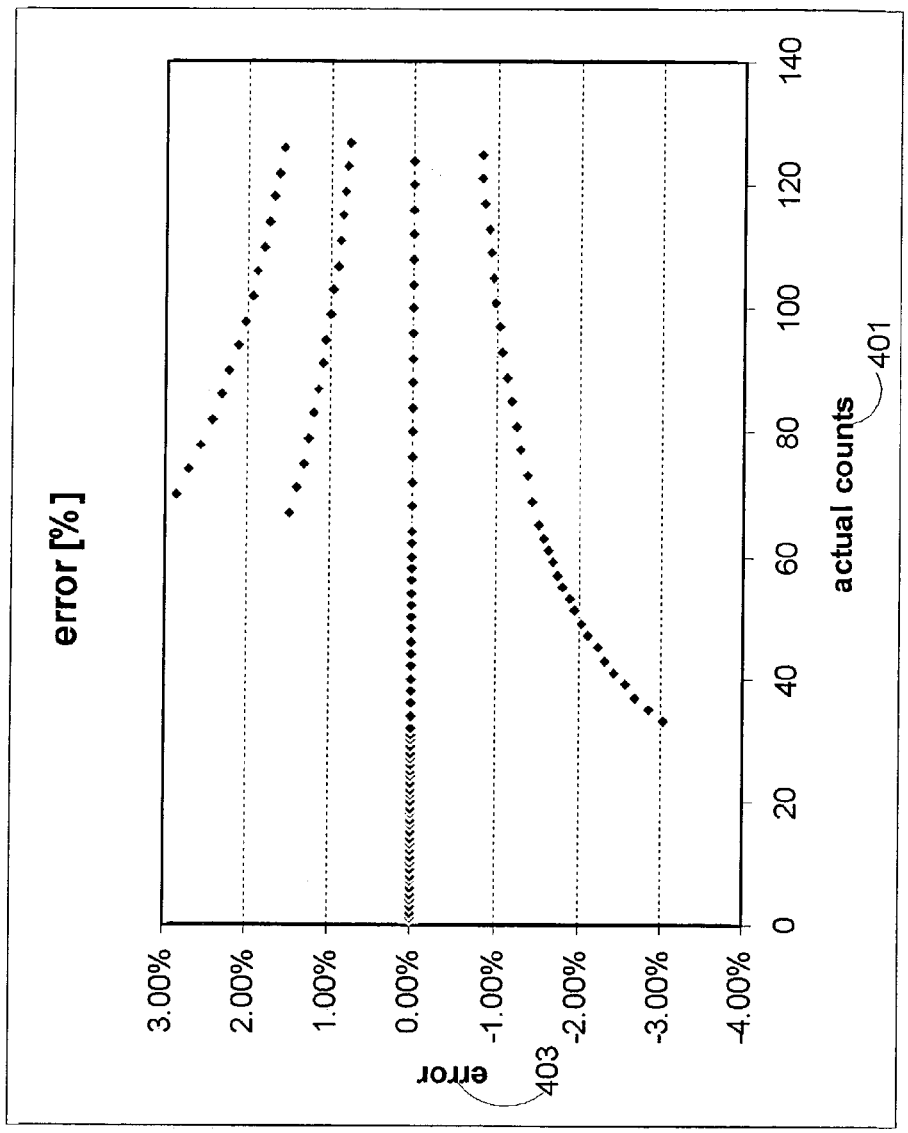
FIG. 4 shows an error window corresponding to the flow diagram shown in FIG. 3.

FIG. 4 shows an error window corresponding to flow diagram 300 as shown in FIG. 3, in which a percentage error 403 is plotted in relation to a count 401 that is determined by tracking detector 203. Percentage error 403 relates the error between count 401 and the recovered count after the converting the displacement value from the packet data stream to the recovered count. As shown in FIG. 4, the maximum percentage error is approximately 3%. Percentage error 403 is dependent upon count 401, where the maximum percentage error decreases with an increase of count 401.

The process of converting the displacement value can be illustrated by the examples that were previously discussed. With a count equal to 39, the corresponding numerical component is 3 (0011b). Additionally, a flag component is included so that the numerical component can be properly converted. In this case, the numerical component is converted using the inverse function:

$$2 \cdot \text{(numerical component)} + 32 \quad (\text{EQ. 3})$$

Substituting into EQ. 3, one determines that the recovered count is 38, while the count is equal to 39. The resulting recovered count has an error of one count or approximately 2.5%. With a count equal to 103, the corresponding numerical component is 10 (1010b). Additionally, a flag component is included so that the numerical component can be properly converted. In this case, the numerical component is converted using the inverse function:

$$4 \cdot \text{(numerical component)} + 64 \quad (\text{EQ. 4})$$

Substituting into EQ. 4, one determines that the recovered count is 104, while the actual count is 103. The resulting recovered count has an error of one count or approximately 1%.

Figure 5:
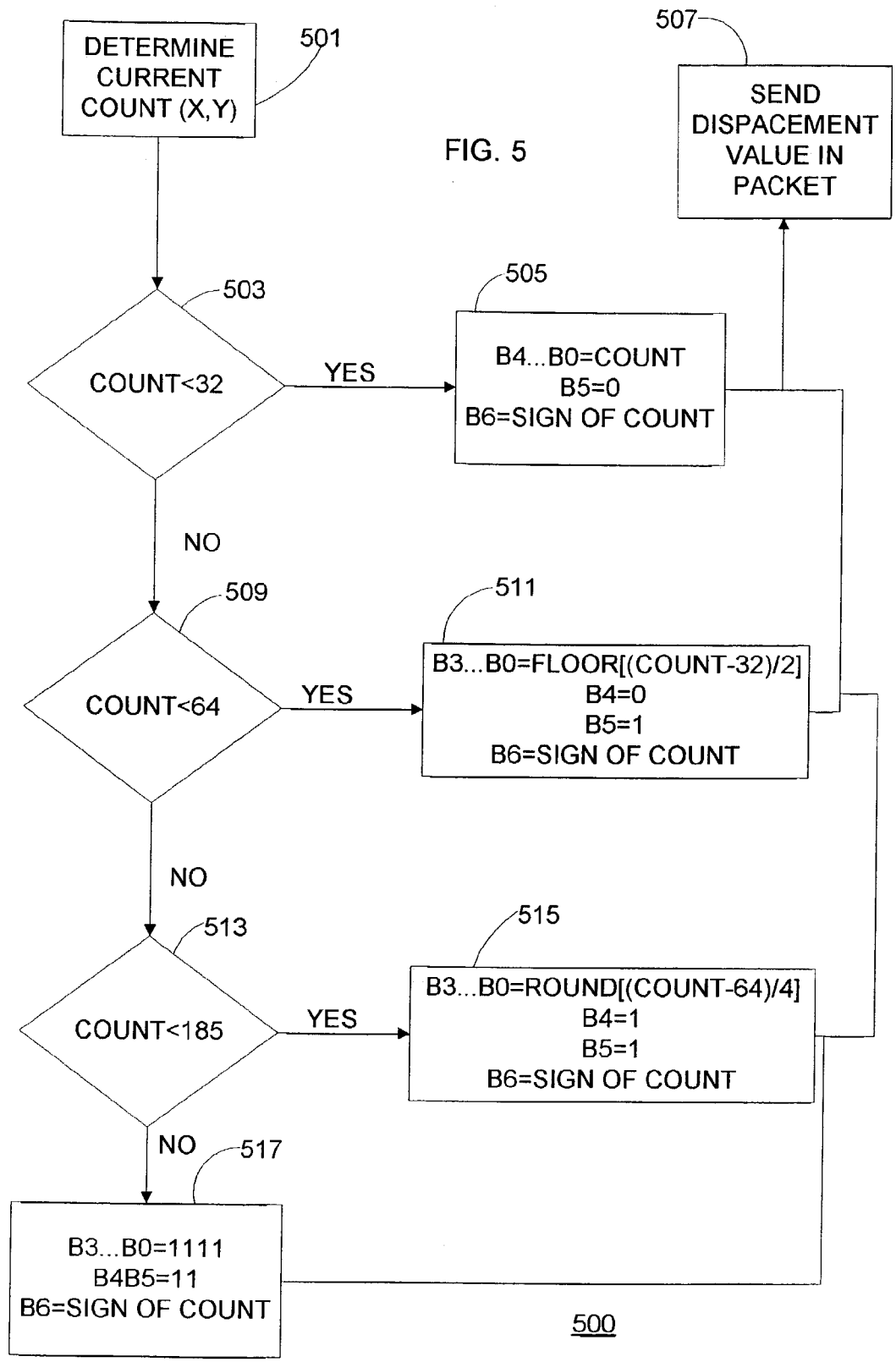
FIG. 5 shows a second flow diagram for compressing motion information from a wireless pointer device to a computing system in accordance with an embodiment of the invention.

FIG. 5 shows a flow diagram 500 for compressing motion information from a wireless pointer device (e.g. mouse 161) to computer 110 in accordance with a variation of the embodiment of the invention. ΔX,ΔY values in the range of [−184 . . . +184] use only 7 bits for each sampling period, corresponding to a packet transmission by transmitter 209. One bit is used for a sign component, 4 or 5 bits are used to contain precision information (a numerical component), while the remaining bits (one or two) are flags indicating how to process the numerical value contained in the precision information. Table 2 shows a second exemplary embodiment for compressing motion information from tracking detector 203 that corresponds to flow diagram 500.

TABLE 2

SECOND EXEMPLARY EMBODIMENT FOR COMPRESSING MOTION INFORMATION

| Bit 5 | Bit 4 | Bit 3210 | Used if | How count is encoded | Max. error [counts] | Max. error [%] |
|---|---|---|---|---|---|---|
| 0 | $b_4$ | $b_3b_2b_1b_0$ | count = 0 . . . 31 | $b_4b_3b_2b_1b_0$ | 0 | 0 |
| 1 | 0 | $b_3b_2b_1b_0$ | count = 32 . . . 63 | $b_3b_2b_1b_0$ = floor [(count − 32)/2] | 1 | 3 |
| 1 | 1 | $b_3b_2b_1b_0$ | count = 64 . . . 184 | $b_3b_2b_1b_0$ = round [(count − 64)/8] | 4 | 5.9 |
| 1 | 1 | 1111 | count > 184 | | | |

With flow diagram 500, each count for each dimension is processed so that only 7 bits are required for representing displacement information in each packet of the packet data stream. Each displacement value comprises a sign component (corresponding to the direction of movement in a given dimension), a numerical component (corresponding to a magnitude of the movement), and a flag component (corresponding to an indicator for processing the magnitude component at user input interface 160. In step 501, counts (corresponding to a first count for the x-dimension and a second count corresponding to the y-dimension) are obtained from tracking detector 203 are provided to microprocessor 201. In step 503, if the count is less than 32, the numerical component (bits 4, 3, 2, 1, and 0) is equated to the count. Also, the flag component comprises bit 5 and is set to '0'. In step 309, if the count is less than 64 and greater than 32, step 511 is executed in which the numerical component (bits 3, 2, 1, and 0) is equated to:

$$\text{floor}((\text{count}-32)/2) \tag{EQ. 5}$$

where the "floor" function truncates the argument to the integer value. As an example, if the count equals 39, floor((39−32)/2)=floor(7/2)=3. Also, the flag component comprises bits 4 and 5, which are set to '0' and '1', respectively. If the count is equal or greater than 64, step 513 is executed. If the count is less than 185, step 515 is executed in which the numerical component is equated to:

$$\text{round}(\text{count}-64)/4) \tag{EQ. 6}$$

where the "round" function rounds the argument to the nearest integer value. As an example, if the count equals 103, round((103−64)/4)=round(39/4)=10 (1010b). Also the flag component comprises bits 4 and 5, both of which are set to '1'. If the count is greater than or equal to 185, step 517 is executed in which the numerical component and flag component are set to all 1's.

As with the first example that was previously discussed, the displacement value is converted into a recovered count that is approximately equal to the count, as provided by tracking detector 203, by utilizing an approximate inverse function at computer 110.

Figure 6:
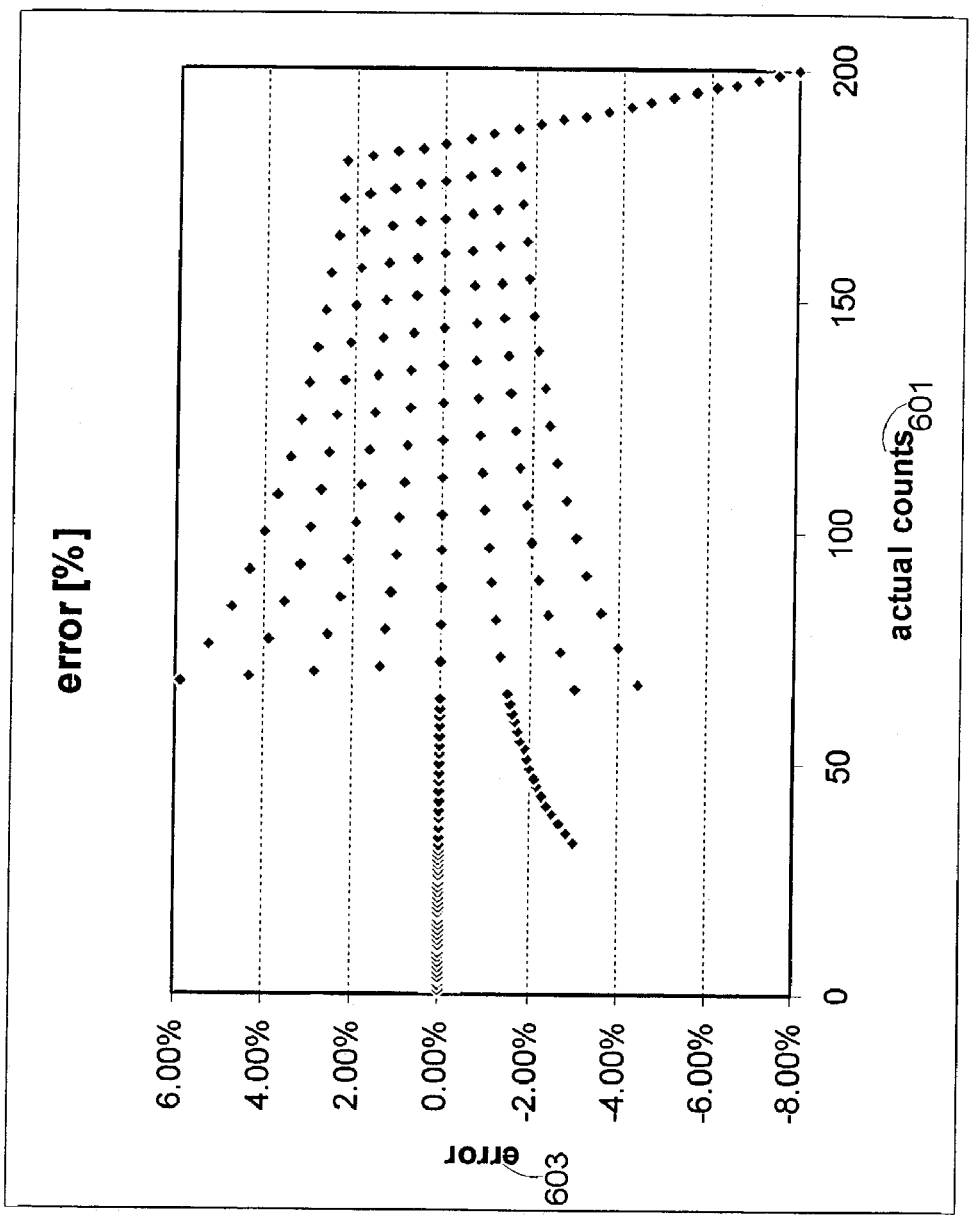
FIG. 6 shows an error window corresponding to the flow diagram shown in FIG. 5.

FIG. 6 shows an error window corresponding to flow diagram 500 as shown in FIG. 5, in which a percentage error 603 is plotted in relation to a count 601. Percentage error 603 relates the error between count 601 and the recovered count after the converting the displacement value from the packet data stream to the recovered count. As shown in FIG. 4, the maximum percentage error is approximately 4%. Percentage error 603 is dependent upon count 601, where the maximum percentage error decreases with an increase of count 601.

Comparing FIG. 6 with FIG. 4, one observes that the maximum percentage error that is associated with the second exemplary embodiment is slightly larger than with the first exemplary embodiment (4% vs. 3%). A reason for the larger maximum percentage error is that the second exemplary embodiment corresponds to a greater degree of compression than the first exemplary embodiment. Typically, compression (scaling) parameters are selected so that the packet data stream can accommodate the motion information that needs to be transported to computer 110. Moreover, other embodiments may utilize a different number of compression functions and inverse functions in order to limit a maximum percentage error.

Figure 7:
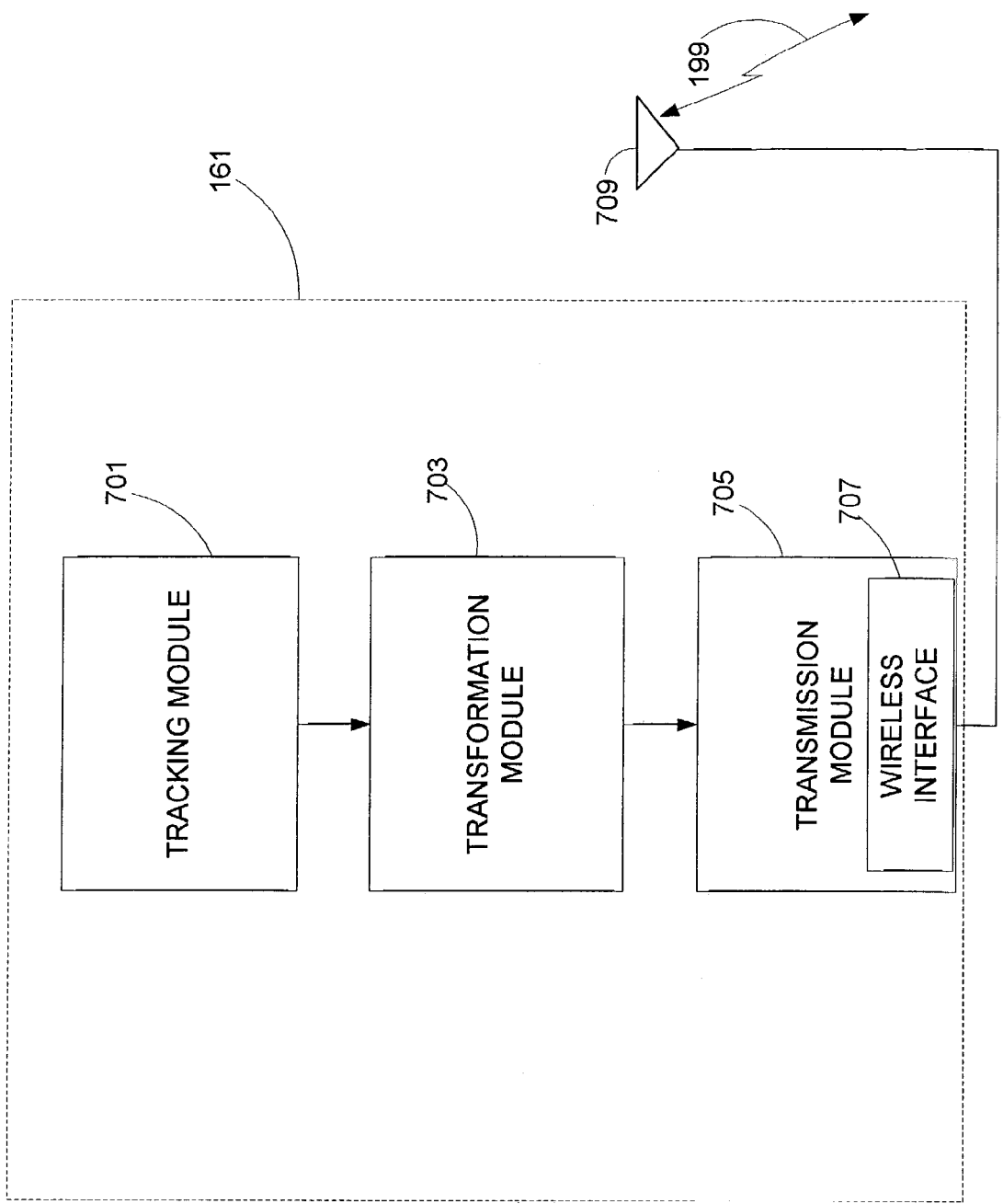
FIG. 7 shows a functional diagram of a wireless mouse in accordance with an embodiment of the invention.

FIG. 7 shows a functional diagram of wireless mouse 161 in accordance with an embodiment of the invention. A tracking module 701 obtains motion information about wireless mouse 161. In the embodiment, some functionality of tracking module is assumed by tracking detector 203 as shown in FIG. 2. Tracking detector 203 may be implemented with an application specific integrated circuit (ASIC), although with other embodiments, the functionality of tracking module 203 may be assumed, entirely or partially, by discrete logic circuitry or by a processor such as microprocessor 201. In the embodiment, tracking detector 701 uses an optically coupled motion sensor to detect incremental movement in both the x-dimension and the y-dimension. Tracking detector 701 accumulates counts for the two dimensions until sampled by a transformation module 703. In the embodiment, transformation module 703 is assumed by microprocessor 201. Transformation module 703, processes counts from tracking module 701 to form displacement values as discussed in the context of flow diagrams 300 and 500, although other embodiments of the invention may utilize other scaling parameters so that the packet data stream can accommodate the motion information from tracking module 701. The displacement value is incorporated in the packet data stream by transmission module 705, which transmission module 705 subsequently transmits the packet data stream through wireless interface 707 and transmitting antenna 709. In the embodiment, transmission module 705 utilizes one of four wireless channels, where each channel has an approximate 50 KHz bandwidth at approximately 27 MHz.

Figure 8:
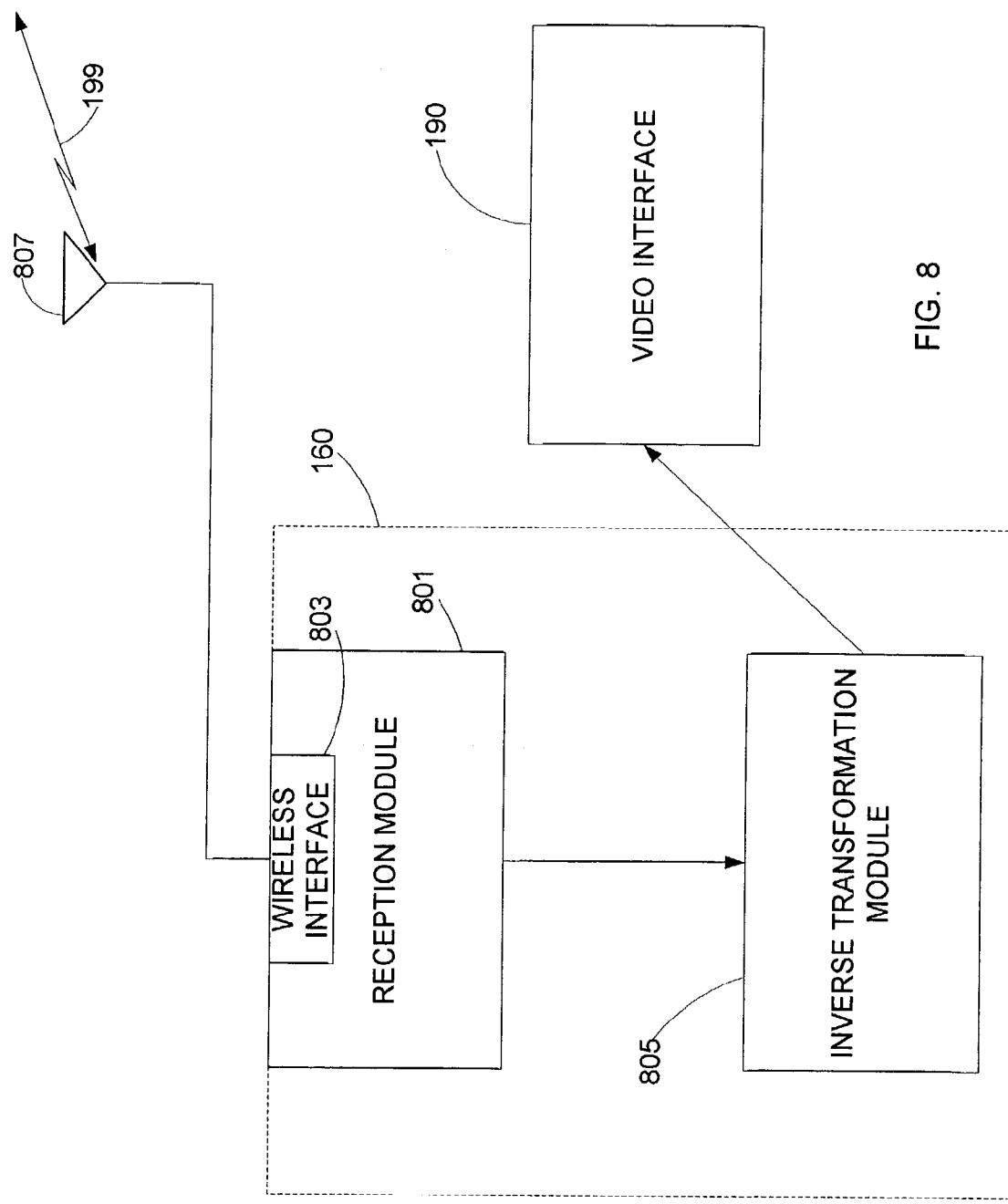
FIG. 8 shows a functional diagram of a user interface that receives motion information from the wireless pointer device that is shown in FIG. 7.

FIG. 8 shows a functional diagram of user input interface 160 that receives motion information from wireless mouse 161 that is shown in FIG. 7. A reception module 801 receives motion information from wireless mouse 161 (as transmitted by transmission module 703 through transmission module 705 as shown in FIG. 7) through a receiving antenna 807 and a wireless interface 803. Reception extracts displacement values from the packet data stream and presents the displacement values to an inverse transformation module 805. Inverse transformation module 805 converts the displacement values into recovered counts utilizing appropriate inverse functions. Inverse transformation module 805 presents the recovered counts to video interface 190 so that a user can observe a representation of the movement of wireless mouse 161 on monitor 191.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method for communicating motion information from a wireless pointer device, the motion information conveyed on a packet data stream and transported on a wireless channel, the method comprising:

(a) determining a first count that represents a movement of the wireless pointer device in a first dimension, wherein the first count comprises a first original number of bits;

(b) if the first count exceeds a lint threshold, compressing the first count to form a first displacement value, wherein a first compressed number of bits is less than the first original number of bits, and wherein the packet data stream accommodates the motion information;

(c) if the first count is not greater than the first threshold, equating the first displacement value to the first count; and (d) transmitting the first displacement value in a data packet over the wireless channel, wherein the data packet is one of a plurality of data packets, and wherein the packet data steam comprises the plurality of data packets.

2. The method of claim 1, wherein (b) utilizes a plurality of functions to compress the first count across a range of operation.

3. The method of claim 2, wherein the first displacement value comprises a flag component and a numerical component, wherein (c) comprises setting the flag component to a first pattern and setting the numerical component to the first count, and wherein (b) comprises:
   (1) if the first count is greater than a second threshold and not greater than a third threshold, setting the flag component to a second pattern and transforming the numerical component by utilizing a first function that is associated with a first offset and a first scaling factor; and
   (2) if the first count is greater than the third threshold, setting the flag component to a third pattern and transforming the numerical component by utilizing a second function that is associated with a second offset and a second scaling factor.

4. The method of claim 3, wherein the first displacement value further comprises a sign component, the method further comprising:
   (e) setting the sign component that is indicative of a direction of the movement in the first direction.

5. The method of claim 3, wherein the first displacement value is represented by a two's complement format.

6. The method of claim 3, wherein the first function is associated with truncating a first argument and the second function is associated with rounding a second argument.

7. The method of claim 1, further comprising:
   (e) determining a second count that represents the movement in a second dimension, wherein the second count comprises a second original number of bits;
   (f) if the second count exceeds the first threshold, compressing the second count to form a second displacement value, wherein a second compressed number of bits is less than the second original number of bits;
   (g) if the second count is not greater than the first threshold, equating the second displacement value to the second count; and
   (h) transmitting the second displacement value in the data packet.

8. The method of claim 7, wherein the second displacement value comprises a second flag component and a second numerical component, wherein (c) comprises setting the second flag component to a first pattern and setting the second numerical component to the second count, and wherein (b) comprises:
   (1) if the second count is greater than a second threshold and not greater than a third threshold, setting the second flag component to a second pattern and transforming the second numerical component by utilizing a first function that is associated with a first offset and a first scaling factor; and
   (2) if the first count is greater than the third threshold, setting the second flag component to a third pattern and transforming the second numerical component by utilizing a second function that is associated with a second offset and a second scaling factor.

9. The method of claim 1, wherein the first displacement value comprises a flag component and a numerical component, wherein (c) comprises setting the flag component to a first pattern and setting the numerical component to the first count, and wherein (b) comprises:
   (1) if the first count is greater than the first threshold and not greater than a second threshold, setting the flag component to a second pattern and transforming the numerical component by utilizing a first function that is associated with a first offset and a first scaling factor;
   (2) if the first count is greater tan the second threshold and not greater than a third threshold, setting the flag component to a third pattern and transforming the numerical component by utilizing a second function that is associated with a second offset and a second scaling factor; and
   (3) if the first count is greater than a third threshold, setting the flag component to a fourth pattern and the numerical component to a fixed value.

10. The method of claim 1, further comprising:
    (e) receiving the first displacement value in the data packet;
    (f) inverse transforming the first displacement value to obtain a recovered count, wherein the recovered count approximately equals the first count; and
    (g) providing the recovered count to a display module, wherein the recovered count is associated with a display position of a pointer indicator.

11. The method of claim 10, wherein the first displacement value comprises a flag component and a numerical component, and wherein (f) comprises:
    (1) if the flag component is equal to a first pattern, setting the recovered count to the numerical component;
    (2) if the flag component is equal to a second pattern, inverse transforming the first displacement value to the recovered count by utilizing a first inverse function; and
    (3) if the flag component is equal to a third pattern, inverse transforming the first displacement value to the recovered count by utilizing a second inverse function.

12. A computer-readable medium having computer-executable instructions for performing the method recited in claim 1.

13. A computer-readable medium having computer-executable instructions for performing the method recited in claim 3.

14. A computer-readable medium having computer-executable instructions for performing the method recited in claim 8.

15. A computer-readable medium having computer-executable instructions for performing the method recited in claim 10.

16. A computer-readable medium having computer-executable instructions for performing the method recited in claim 11.

17. A method for communicating motion information from a wireless pointer device, the information conveyed on a packet data stream and transported on a wireless channel, the method comprising:
    (a) determining a number of counts that represent a movement of the wireless pointer device; and
    (b) selecting an encoding scheme that is based on (a).

18. A wireless pointer system for communicating motion information of a wireless pointer device with a packet data stream, the packet data stream data transported on a wireless channel, the wireless pointer system comprising:
    (a) a tracking module that determines a tracking count, wherein the tracking count is associated with a movement of the wireless pointer device in a first dimension, and wherein the tracking count comprises an original number of bits;
    (b) a transformation module that is connected to the tracking module and receives the tracking count from the tracking module, the transformation module compressing the tracking count to form a displacement value in order that the packet data stream accommodates the motion information, wherein the transformation module comprises a first processor, and wherein the displacement value comprises a flag component and a numerical component, the first processor configured to perform:

(1) if the tracking count is not greater than the first threshold, setting the numerical component to the tracking count and the flag component to a first pattern;

(2) if the tracking count is greater than a second threshold and not greater than a third threshold, setting the flag component to a second pattern and transforming the numerical component by utilizing a first function that is associated with a first offset and a first scaling factor; and (3) if the tracking count is greater than the third threshold, setting the flag component to a third pattern and transforming the numerical component by utilizing a second function with a second offset and a second scaling factor; and (c) a transmission module that is coupled to a transmitting antenna and that transmits the packet data stream over the wireless channel.

19. A wireless pointer system for communicating motion information of a wireless pointer device with a packet data stream, the packet data stream data transported on a wireless channel, the wireless pointer system comprising:

(a) a tracking module that determines a tracking count, wherein tracking count is associated with a movement of the wireless pointer device in a first dimension, and wherein the tracking count comprises an original number of bits;

(b) a transformation module that is connected to the tracking module and receives the tracking count from the tracking module, the transformation module compressing the tracking count to form a displacement value in order that the packet data stream accommodates the motion information;

(c) a transmission module that is coupled to a transmitting antenna and that transmits the packet data stream over the wireless channel;

(d) a reception module that is coupled to a receiving antenna, that receives the packet data stream over the wireless channel, and that extracts the displacement value from the packet data stream; and (e) an inverse transformation module that is connected to the reception module, that obtains the displacement value from the packet data stream, and converts the displacement value to a recovered count, wherein the recovered count approximately equals the tracking count, wherein the displacement value comprises a flag component and a numerical component and wherein the inverse transformation module comprises a second processor, the second processor configured to perform:

(1) if the flag component is equal to a first pattern, setting a recovered count to the numerical component wherein the recovered count approximates the tracking count;

(2) if the flag component is equal to a second pattern, inverse transforming the first displacement value to the recovered count by utilizing a first inverse function; and (3) if the flag component is equal to a third pattern, inverse transforming the first displacement value to the recovered count by utilizing a second inverse function.

20. An apparatus for receiving a displacement value from a wireless pointer device over a wireless channel, the displacement value contained in a packet data stream, the displacement value representing movement of the wireless pointer device in a first dimension, the apparatus comprising:

(a) a reception module that is coupled to a receiving antenna, that receives the packet data stream over the wireless channel, and that extracts a displacement value from the packet data stream; and (b) a inverse transformation module that is connected to the reception module and that converts the displacement value to a recovered count that represents the movement of the wireless pointer device, wherein the recovered count approximate the movement of the wireless pointer device, wherein the inverse transformation module comprises a processor, wherein the displacement value comprises a flag component and a numerical component, and wherein the processor is configured to perform:

(1) if the flag component is equal to a first pattern, setting the recovered count to the numerical component;

(2) if the flag component is equal to a second pattern, inverse transforming the displacement value to the recovered count by utilizing a first inverse function; and (3) if the flag component is equal to a third pattern, inverse transforming the displacement value to the recovered count by utilizing a second inverse function.

21. A mouse for communicating motion information of the mouse with a user interface over a packet data stream, the packet data stream transported on a wireless channel, the mouse comprising:

(a) a tracking module that determines a first count and a second count, wherein the first count is associated with a movement of the mouse in a first dimension and the second count is associated with the movement of the mouse in a second dimension, and wherein the first count comprises a first original number of bits and the second count comprises a second original number of bits;

(b) a transformation module that is connected to the tracking module and that receives the first count and the second count from the tracking module, the transformation module compressing the first count to form a first displacement value and a second displacement value in order that the packet data stream accommodates the motion information, the first displacement value comprising a first flag component and a first numerical component, the second displacement value comprising a second flag component and a second numerical component, the transformation module comprising a processor, the processor configured to perform:

(1) if the first count is not greater than the first threshold, setting the first numerical component to the first count and the first flag component to a first pattern;

(2) if the first count is greater than a second threshold and not greater than a third threshold, setting the first flag component to a second pattern and transforming the first numerical component by utilizing a first function with a first offset and a first scaling factor;
(3) if the first count is greater than the third threshold, setting the first flag component to a third pattern and transforming the first numerical component by utilizing a second function with a second offset and a second scaling factor;
(4) if the second count is not greater than the first threshold, setting the second numerical component to the second count and the second flag component to the first pattern;
(5) if the second count is greater than the second threshold and not greater than the third threshold, setting the first flag component to the second pattern and transforming the second numerical component by utilizing the first function; and
(6) if the second count is greater than the third threshold, setting the second flag component to the third pattern and transforming the second numerical component by utilizing the second function; and (c) a transmission module that is coupled to a transmitting antenna and that transmits the packet data stream over the wireless channel.

* * * * *

UNITED STATES PATENT AND TRADEMARK OFFICE
CERTIFICATE OF CORRECTION

PATENT NO. : 6,995,750 B2
APPLICATION NO. : 10/392029
DATED : February 7, 2006
INVENTOR(S) : Albulet et al.

It is certified that error appears in the above-identified patent and that said Letters Patent is hereby corrected as shown below:

On The Title Page, Item (54), in "Title", delete "HIGH SPEED" and insert -- HIGH-SPEED --, therefor.

In column 1, line 1–2, delete "HIGH SPEED" and insert -- HIGH-SPEED --, therefor.

In column 1, line 36, after "(800 dpi resolution)" insert -- = --.

In column 3, line 14–15, delete "illustrate d" and insert -- illustrated --, therefor.

In column 8, line 19 (EQ. 3), delete "2 ✗ (numerical component)+32" and insert -- 2 * (numerical component) + 32 --, therefor.

In column 8, line 30 (EQ. 4), delete "4 ✗ (numerical component)+64" and insert -- 4 * (numerical component) + 64 --, therefor.

In column 9, line 24 (EQ. 6), delete "round(count–64)/4)" and insert -- round((count–64)/4) --, therefor.

In column 10, line 9, after "703" delete ",".

In column 10, line 55, in Claim 1, delete "lint" and insert -- first --, therefor.

In column 10, line 66, in Claim 1, delete "steam" and insert -- stream --, therefor.

In column 12, line 3, in Claim 9, delete "tan" and insert -- than --, therefor.

In column 13, line 33, in Claim 19, after "wherein" insert -- the --.

In column 13, line 61–62, in Claim 19, after "component" insert -- , --.

In column 14, line 16, in Claim 20, delete "a" and insert -- an --, therefor.

UNITED STATES PATENT AND TRADEMARK OFFICE
CERTIFICATE OF CORRECTION

PATENT NO.        : 6,995,750 B2
APPLICATION NO.  : 10/392029
DATED             : February 7, 2006
INVENTOR(S)       : Albulet et al.

It is certified that error appears in the above-identified patent and that said Letters Patent is hereby corrected as shown below:

In column 14, line 20, in Claim 20, delete "approximate" and insert -- approximates --, therefor.

Signed and Sealed this

Twenty-first Day of July, 2009

JOHN DOLL
*Acting Director of the United States Patent and Trademark Office*